United States Patent [19]

Prucher

[11] Patent Number: 4,633,148
[45] Date of Patent: Dec. 30, 1986

[54] LINEAR DRIVE MOTOR MULTIPLE CARRIER CONTROL SYSTEM

[75] Inventor: Bryan P. Prucher, Clarkston, Mich.

[73] Assignee: Chrysler Motors Corporation, Highland Park, Mich.

[21] Appl. No.: 695,028

[22] Filed: Jan. 25, 1985

[51] Int. Cl.$^4$ ............................................. H02K 41/02
[52] U.S. Cl. ...................... 318/135; 318/37; 318/13
[58] Field of Search .................... 318/37, 38; 310/135, 310/124, 14

[56] References Cited

U.S. PATENT DOCUMENTS

| 3,407,749 | 10/1968 | Frig | 310/134 |
|---|---|---|---|
| 3,549,966 | 12/1970 | Wilson | 310/134 |
| 3,721,874 | 3/1973 | Pelenc | 318/135 |
| 3,792,665 | 2/1974 | Nelson | 318/135 X |
| 3,803,466 | 4/1974 | Starkey | 318/135 |
| 3,934,183 | 1/1976 | Saüfferer | 318/135 |
| 4,068,152 | 1/1978 | Nakamura et al. | 318/135 |
| 4,348,618 | 9/1982 | Nakamura et al. | 318/38 |

*Primary Examiner*—Donovan F. Duggan
*Attorney, Agent, or Firm*—Mark P. Calcaterra

[57] ABSTRACT

Disclosed is a multiple carrier transportation system. The system employs a plurality of linear induction motors positioned along a track. A plurality of carrier units are used for moving work pieces along the track. Each carrier is mounted with a reaction plate or secondary. The reaction plate passes over the linear induction motors and reacts with the electromagnetic field generated therein. The electromagnetic energy induced from the linear induction motors into the secondary produces a mechanical thrust which propels the carrier along the track. A control system utilizing a series of feedback loops and a computer is used to monitor and coordinate the movement of the carriers in the system. Attached to each carrier is a position indicator. The indicator relays position information to position sensors. The sensors relay position information to a control module or computer which determines the velocity and acceleration of the carrier. These values are then compared to a set of velocity and acceleration curves stored in memory. Deviations between the actual and desired speeds are corrected for by varying the power input to the linear induction motors. The control modules or computers are interconnected and receive information and instruction from a central data computer. The position, velocity, and acceleration of each carrier in the system is thus monitored and controlled.

10 Claims, 4 Drawing Figures

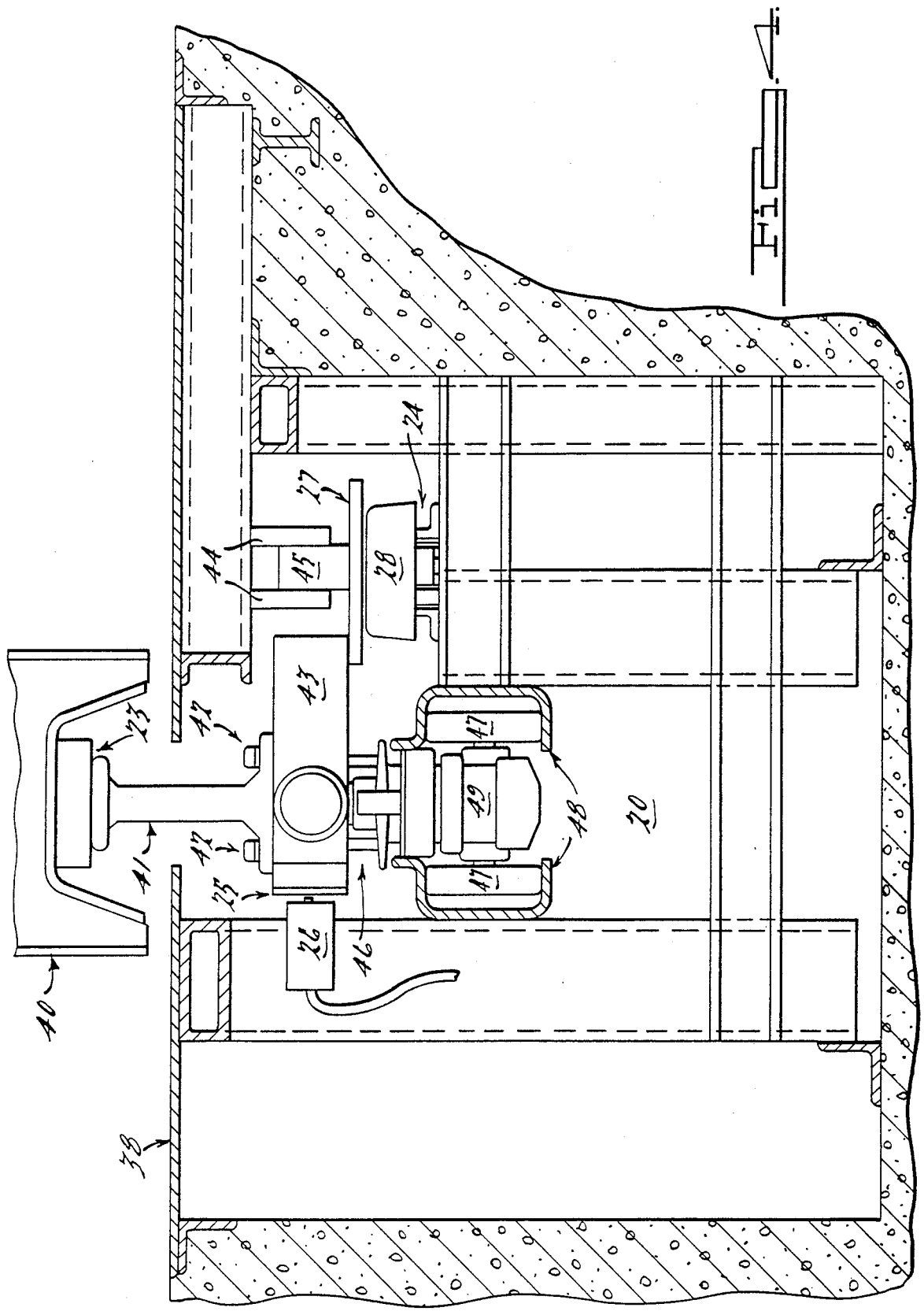

LINEAR DRIVE MOTOR MULTIPLE CARRIER CONTROL SYSTEM

BACKGROUND AND SUMMARY OF THE INVENTION

This invention relates to a tracked multiple carrier transportation system. The system employs a series of linear induction motors spaced along a track. A plurality of carriers are used for moving objects through the system. A reaction plate is mounted on each carrier and acts as a secondary for the linear induction motors. The secondary is designed to interact with the two stator halves of the motor. The interaction between the reaction plate and the electromagnetic field generated by the linear induction motors produces a mechanical thrust which propels the carriers down the track.

Other similar transportation systems exist. In U.S. Pat. No. 3,803,466, issued to Ronald C. Starky on Apr. 9, 1974, a tracked vehicle propulsion system employs a plurality of linear synchronous motors. Trains of cars are mounted to ride along a track. Each car bears a linear rotor having interdigitated magnetic poles and is propelled by successive linear motors. Every motor, or thruster, is provided with thruster control that is connected to establish inter-thruster logic.

Unlike the subject invention, the velocity of the cars in the Starky patent is controlled by regulating the input frequency to the linear synchronous motors. Change in speed is achieved by sweeping the stator frequency from synchronism with one frequency to synchronism with another frequency. In the subject invention, the input frequency does not act as a control signal. A change in carrier velocity is achieved by regulating the input voltage to linear induction motors. The thrust produced is proportional to the square of the input voltage.

Another obvious difference between the subject invention and the Starky patent lies in the type of secondaries employed. The subject invention uses a reaction plate which is a flat piece of metal which interacts with the stators of the linear induction motors. In the preferred embodiment, the reaction plate is positioned to pass over the stators. The reaction plate can be made of a variety of metals, including brass, steel, copper and aluminum, or a combination of these materials. The electromagnetic forces induced from the stators (primary) to the reaction plate (secondary) produces energy in the form of electromagnetic thrust. The Starky patent discloses a similar thrust. However, that system utilizes a secondary consisting of interdigitated magnetic poles. This is clearly different than the present system and serves to highlight the differences between the two types of motors used.

Another transportation system is found in U.S. Pat. No. 4,348,618 issued to Nakamura et al. on Sept. 27, 1982. It deals with a feeding system for a linear motor transportation system. It employs a number of linear motors along a track to generate a moving magnetic field for driving trains.

Unlike the subject invention, however, the speed and acceleration of the train in the Nakamura patent does not play a part in the control logic. The linear thrusters are energized and de-energized depending solely on the presence or absence of the train.

In the subject invention, a control system utilizing a series of feedback loops and a central computer is employed to monitor and coordinate the movements of the carriers in the system. Each loop consists of a linear induction motor, a position sensor, a position indicator and a control module. The feedback loops are interconnected via the control modules which, in turn, are connected to the central computer.

As the carrier units pass by a linear induction motor, a position indicator which is attached to the carrier is read by a position sensor which is located near the linear induction motor. The sensor relays position information to the control module. The control module electronically determines the velocity and acceleration of the carrier. These values are then compared to a set of velocity and acceleration curves stored in module memory. Using the difference between the calculated and stored information, control signals are generated for increasing, decreasing or maintaining the strength of the powr input to the linear induction motor. Means for monitoring the power input to the motor, for reversing the sense of the power flow, and for disconnecting the power supply are all included in the control module. Accordingly, the position, velocity and acceleration of the carrier units are controlled by regulating the magnitude and sense of the power input to the various linear induction motors.

The thrust produced by a linear induction motor is proportional to the square of its input voltage. By increasing the power input, a greater thrust is produced. The force associated with this thrust translates into a proportional acceleration for the carrier. Deceleration of a carrier is achieved by reversing the direction of the input flow. This generates a thrust in a direction opposite to the movement of the carrier, thereby reducing the speed of the carrier. Once a desired velocity is achieved, the input to the induction motor, or motors, is held at a constant level.

If a current is passed through the stator windings of the linear induction motor in the absence of a secondary, there is the possibility that the coils will burn out due to the high currents generated. Thus, each control module contains a means for disconnecting the power input supply should dangerously high currents in the motor develop or should the position sensor detect the absence of a carrier unit.

In the subject invention, the linear induction motors are positioned along the track to provide continuous electromagnetic contact with the carrier reaction plates. As a reaction plate leaves the influence of one induction motor, it is simultaneously entering the field generated by a subsequent motor.

A variety of position sensors and indicators may be employed in this type of system. For instance, an induction transducer and a series of equally spaced magnetic strips may be used. Similarly, an optical sensor and bar code could also be used. In fact, any suitable system capable of transmitting and receiving position information can be employed. The system, however, must be capable of sensing the presence or absence of the carriers, identifying each unit, and transmitting and receiving information capable of being transformed into velocity and acceleration data.

Overall system logic is established through the use of a central computer. The computer functions to monitor and regulate the operation of the entire system. It should be capable of keeping track of each unit in the system. The desired position, velocity and acceleration of each unit, at each point in the system should also be programmed into the central computer. The computer acts to alert the individual control modules to this information, and directs them to generate control signals for keeping the system running smoothly. The information received by the computer from the various control modules may be relayed to subsequent control modules, thus coordinating the various feedback loops.

Other embodiments are possible. For example, the intelligence of the control module could be incorporated into the central computer.

DESCRIPTION OF THE DRAWINGS

Other objects, features and advantages of the present invention will become more fully apparent from the following detailed description of the preferred embodiment, the appended claims and in the accompanying drawings in which:

FIG. 4 is a cross-sectional view of a tracked system utilizing the disclosed principles as applied in an assembly line environment.

DETAILED DESCRIPTION OF THE PREFERRED EMBODIMENT

Figure 1:
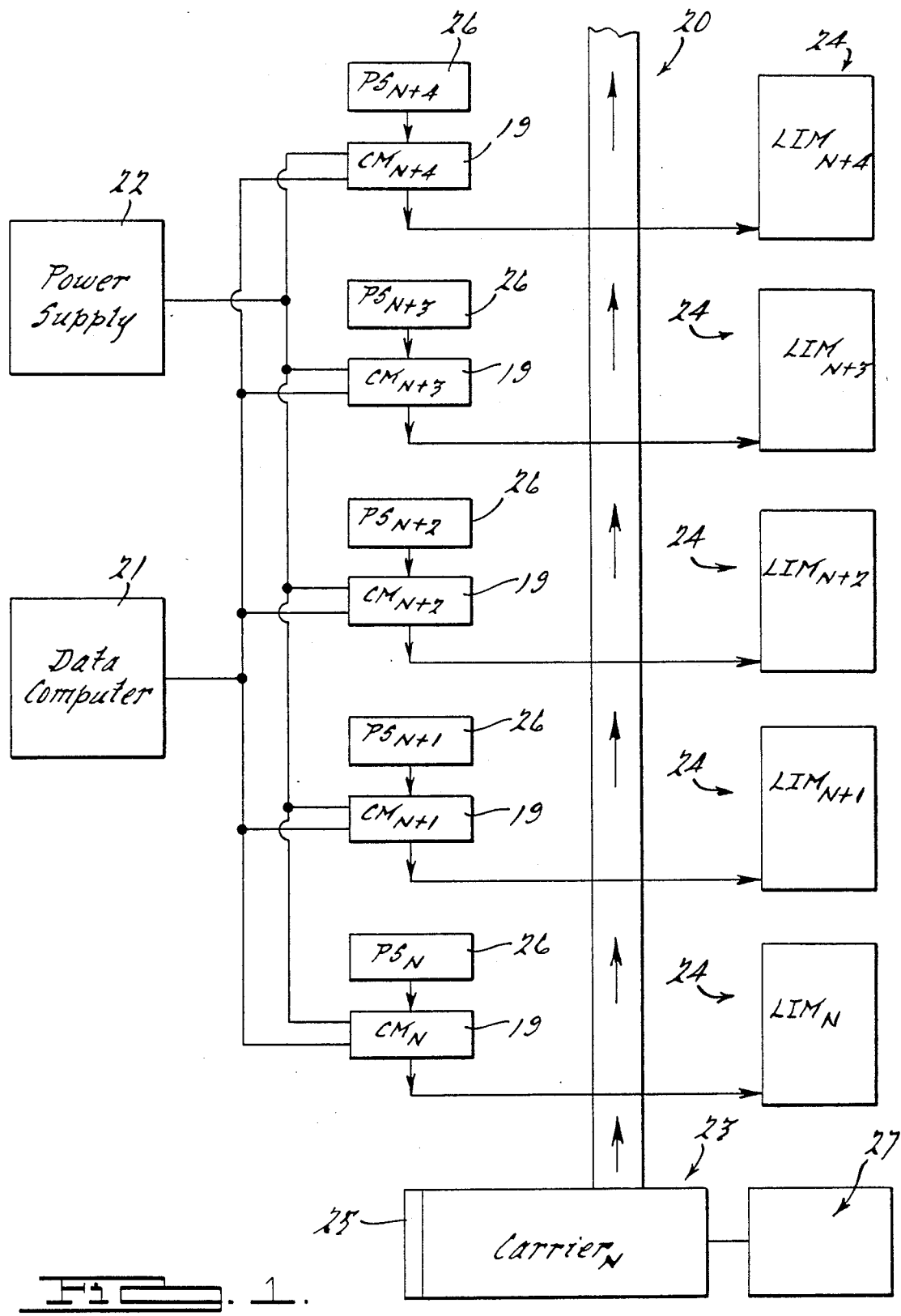
FIG. 1 is a simplified block diagram of the basic operating units in the system.

FIG. 1 is a similified block diagram of the basic operating units in the system. Represented is a portion of a track 20 on which a plurality of carriers 23 ride. Shown is a central data computer 21 and a power supply source 22. Along the track are situated components which together comprise a series of feedback loops. Each loop consists of a linear induction motor 24, a position indicator 25, a position sensor 26 and a control module 19 to power and regulate the carriers as they move through the system. The loops are interconnected via the control modules 19 which, in turn, are connected to the central data computer 21. This allows the computer to monitor and coordinate the control signal generated in each feedback loop.

As a carrier 23 passes along the track 20, a reaction plate 27 which is affixed to the carrier 23, passes over the stators 28 of the linear induction motors 24. The interaction between the plate 27 and the electromagnetic field generated within the motors 24 results in a thrust which propels the carrier 23 along the track 20. The motors 24 are positioned to provide continuous electromagnetic contact with the reaction plate 27. As the carrier leaves the influence of one linear motor 24, it is simultaneously entering the influence of a subsequent motor.

A position indicator 25 is affixed to each carrier 23 such that it is able to communicate information to the position sensors 26 located near each linear induction motor 24. Information from the sensor 26 is relayed to the Data Computer 21 via the control module 19.

The control module 19 electronically determines the velocity and acceleration of the carrier units 23 and compares these values to a set of perdetermined data values stored in the memory of the module 19. Deviations between the calculated values and the reference values result in a control signal being generated to regulate the power input from the power source 22 into the linear induction motor.

A plurality of feedback loops are located along the track 20. This allows the speed of the carriers 23 to be regulated at each point in the system.

Figure 2:
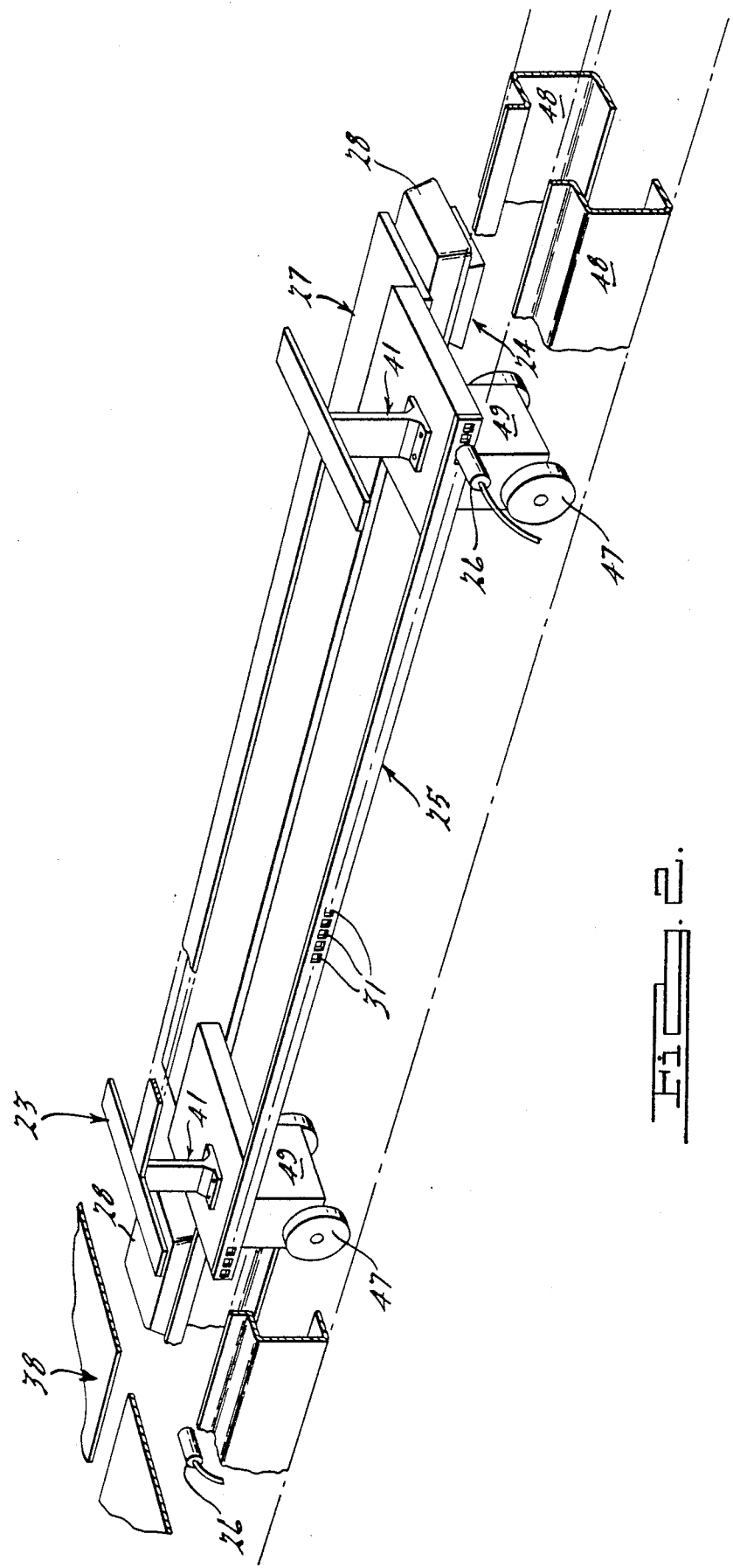
FIG. 2 represents a single feedback loop.

In FIG. 2, a carrier unit 23 has entered the sphere, or range of influence of a linear induction motor 24 and position sensor 26. The indicator 25 attached to the carrier 23 is in position to be read by the sensor 26. The indicator 25 is considered an integral part of each loop because even in its absence, it affects the control signals generated. Where the sensor 26 does not detect the presence of an indicator 25, the power supply is electronically disconnected from the linear induction motor 24.

As depicted in FIG. 2, the position sensor 26 is an induction transducer. It is located off to the side of the track 20 and is positioned to read the position indicator 25 attached to the carrier 23. The position indicator 25 in this particular embodiment is a series of equally spaced conductive strips or markings 31 attached to the side of the carrier 23. As the carrier 23 moves past the position sensor 26, the conductive strips or markings 31 will interfere with the magnetic field of position sensor 26 allowing it to generate pulses indicative of the carrier's position. Immediately available from the position pulse via computation is the velocity and acceleration values of the carrier. These values are the first and second derivatives of the position pulse, and are calculated by the control module 19. Based on these calculations, the control module 19 generates control signals for regulating the power input to the linear induction motor.

Position sensors 26 and indicators 25 could take other forms. For instance, an optical sensor and bar code combination could be employed. The type of sensor and indicator selected is essentially a design choice.

Figure 3:
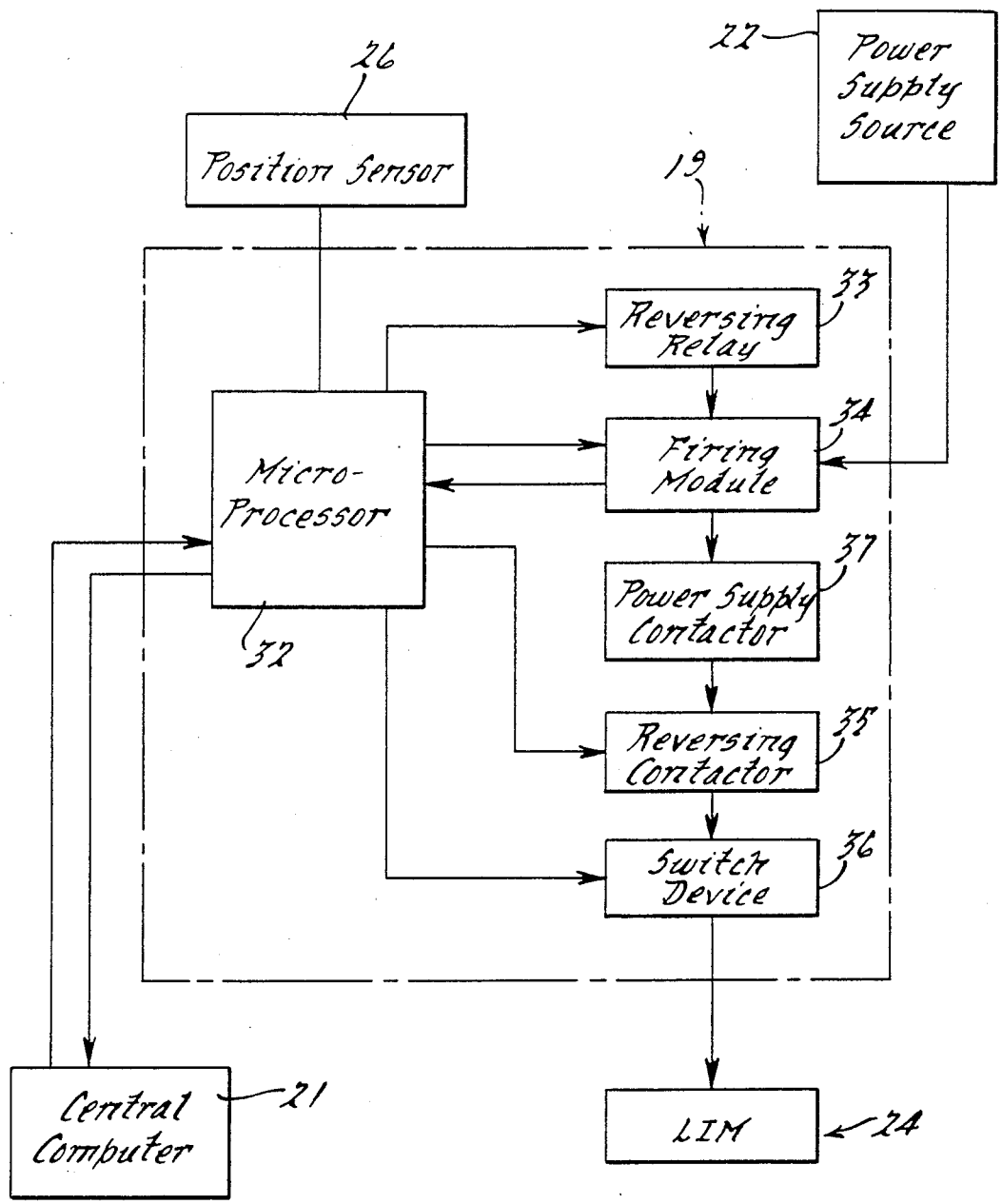
FIG. 3 is a block diagram showing the individual components, comprising the control module, and demonstrating the module's relationship to the other elements in the control system.

The control module 19 which is responsible for generating control signals is comprised of various component parts. FIG. 3 illustrates these various parts. Within each module is a microprocessor 32, a reversing relay 33, a firing module 34, a reversing contact 35, a switching device 36 and a power supply contactor 37 which deliver power to the linear induction motor (LIM) 24 in short bursts, so as not to burn out the stator windings contained therein.

The data computer 21 is connected to each control module 19 via the microprocessors 32. The computer 21 functions to monitor and control the movement of each carrier in the system. It achieves this by coordinating the signals generated in each control module.

The computer 21 should possess the capability of compensating for gaps in the system if certain stations or areas along the track 20 are down. In addition, it should contain the basic velocity requirements for each station, the basic acceleration or deceleration requirements and the desired positions of each carrier 23 at each point along the track.

In order that spacing of stations not be critical, a station offset constant should also be stored in the computer 21 memory. All data can be down loaded and, if necessary, updated at a later date. The use of a central data computer 21 makes error recovery quicker and easier, and eliminates the need to independently program each microprocessor 32.

The microprocessor 32 serves to receive store, and act upon information received from the central computer 21. In addition, it is responsible for receiving input from the position sensor 26 and for generating control signals to operate the other components within the control module.

The microprocessor 32 is the component in the conrol module which determines the velocity and acceleration of the carrier as it passes the position sensor. To determine this, the microprocessor utilizes the information from the sensor to compute the first and second derivative of the position pulse. These values are compared to a set of predetermined values stored in the microprocessor memory. Using the difference between the calculated and stored values, the microprocessor 32 generates control signals for increasing, decreasing or maintaining the power input supply to the linear induction motor 24.

The function of the microprocessor 32 and the function of the data computer 21 could be incorporated into a central control computer. This is a design choice.

Since the thrust produced by a linear induction motor is proportional to the square of the input voltage, the magnitude of the input supply determines whether an increase or decrease in carrier's 23 speed will be affected. By increasing the voltage, the thrust on the carrier reactor plate 27 increases and produces an acceleration in the carrier's velocity. Similarly, by decreasing the input voltage, a speed reduction is achieved. Further, by reversing the input voltage, a thrust in the direction opposing the carrier's movement is produced, thus creating a rapid braking effect. Hence, the velocity and acceleration of the carrier 23 is regulated by controlling the magnitude and sense of the power input to the linear induction motors 24.

The firing module 34 receives control signals from the microprocessor 32 and acts to energize the linear induction motor 24. The firing module 34 is connected to the central power source 22. It controls the voltage supplied to the motor 24. If there is no input from the microprocessor 32, the power supply contactors 37 are removed and the power disengaged.

The reversing relays 33 and contactors 35 operate should deceleration of a carrier 23 become necessary. These components are controlled by the microprocessor 32. They operate to reverse the sense of the power into the linear induction motor 24.

The switching device 36 is sized to the linear induction 24. It delivers power to the motor 24 in short bursts. This helps to prevent excessively high currents from developing in the motor 24, which would burn out the motor's stator windings.

As FIG. 3 indicates, the microprocessor 32 generates signals to operate the reversing relay 33, the firing module 34 and the reversing contactor 35 in response to the information it receives from the position sensor 26 and the appropriate control algorithm in the data computer 21. These signals act to control the magnitude and the sense of the power input to the linear induction motor 24.

FIG. 4 provides a cross-sectional view of the disclosed invention, as applied to an assembly line environment. In the preferred enbodiment shown, the carrier 23 is situated above ground level 38. It carries a workpiece 40. Rigidly mounted to the bottom of the carrier is a guide pole 41. The guide pole 41 extends to the track 20 and beneath the ground level 38. The guide pole 41 is bolted by a series of bolts 42 to a bracket 43 on which the position indicator 25 is located. Opposite the position indicator 25, a reaction plate 27 is attached to the bracket 43. The reaction plate 27 is situated to pass over stators 28 of the linear induction motor 24, which is located off to the side of the carrier unit 23. A guide rail 44 is provided directly above the linear induction motor 24 and the upwardly extending arm 45 of the carrier reaction plate 27 is restricted by the guide rail 44. The rail 44 and arm 45 serve to maintain a suitable gap between the sides of the linear induction motor 23 and the reaction plate 27. Affixed to the bottom of the bracket 43 is a pivoting apparatus 46 and bearing support 49. The apparatus 46 is provided with a plurality of rollers 47 which ride in a rail track 48 as indicated.

The position sensor 26 is located across from the linear induction motor 24. The position indicator 25 passes in front of the sensor 26 as the carrier 23 moves down the track 20.

As illustrated in FIG. 1, a plurality of linear induction motors 24 would be located along the track 20. The desired speed of the carriers at different work stations on the line would be programmed into the computer 21. The computer 21, in conjunction with the feedback loops associated with each motor 24, would make it possible to vary the speed and position of the carrier 23 as required. The disclosed system offers several advantages over current assembly line systems. These include the elimination of mechanical linkages and power transmitting apparatuses.

While the above description constitutes the preferred embodiment of the present invention, it will be appreciated that the invention is susceptible to modification, variation and change without departing from the proper scope of fair meaning of the accompanying claims.

I claim:

1. A multiple carrier transportation system for moving units over a predetermined course, comprising:
   an underground track which spans the course;
   a plurality of carriers engaging the track for movement along the course, each of said carriers having means for carrying at least one of the units to be moved along the course; and
   a control loop associated with each of said carriers, each of said control loops including
   an elongated reaction plate attached to the carrier such that the reaction plate generally spans the length of the carrier;
   a linear induction motor fixed in position along the track for generating the thrust necessary to propel the carrier along a portion of the track, the thrust being produced by the interaction between the reaction plate of the carrier and the electromagnetic field generated by linear induction motor adjacent to the carrier reaction plate;
   a position sensor fixed in position along the track;
   a plurality of position indicators mounted in alignment along the length of the carrier such that the position indicators will pass by the position sensor during movement of the carrier along the track and cause the position sensor to produce a feedback signal indicative of the position of the carrier;
   a control module for controlling the movement of the carrier in response to the feedback signal from the position sensor, computer means being associated with the control module for determining the velocity and acceleration of the carrier, for comparing these velocity and acceleration values to a set of velocity and acceleration curves stored in the memory of the computer means, and for generating a control signal for controlling the voltage supplied to the linear induction motor from a power supply source, said control module including firing means for regulating the magnitude of the electrical power supplied to the linear induction motor and switching means for controlling the transmission and sense of the electrical power to the linear induction motor such that the linear induction motor is capable of generating both forward and reverse thrust.

2. The transportation system of claim 1 wherein each of said control loops are disposed underground along the track.

3. The transportation system of claim 2 wherein the reaction plate and linear induction motor are generally disposed on one side of each of the carriers, and the position sensor and the position indicators are generally disposed on the other side of each of the carriers.

4. The transportation system of claim 3 wherein each of the carriers include a plurality of roller means disposed generally below the carrier for engaging the track.

5. The transportation system of claim 1 including rail means for guiding the reaction plate of each of the carriers such that a predetermined gap is maintained between the reaction plates and the linear induction motors.

6. The transportation system of claim 5 wherein said rail means includes a pair of rails fixed in position along the track, and an arm associated with each of the carrier reaction plates that extends beween these rails.

7. The transportation system of claim 1 wherein the linear induction motors are placed along the track to provide continuous electromagnetic contact with the reaction plates affixed to the carrier units.

8. The transportation system of claim 1 wherein the position sensors comprise an optical transducer and the position indicators comprise optical bar code symbols.

9. The transportation system of claim 1 wherein the position sensors comprise an induction transducer and the position indicators comprise a series of metallic strips located on each carrier.

10. The transportation system of claim 9 where the strips are arranged in equally spaced relationship to each other.

* * * * *